Dec. 20, 1960 W. R. GIBSON 2,964,879
AIR COOLING SYSTEM
Filed July 16, 1956 2 Sheets-Sheet 1

INVENTOR
WILLIAM R. GIBSON

ATTORNEY

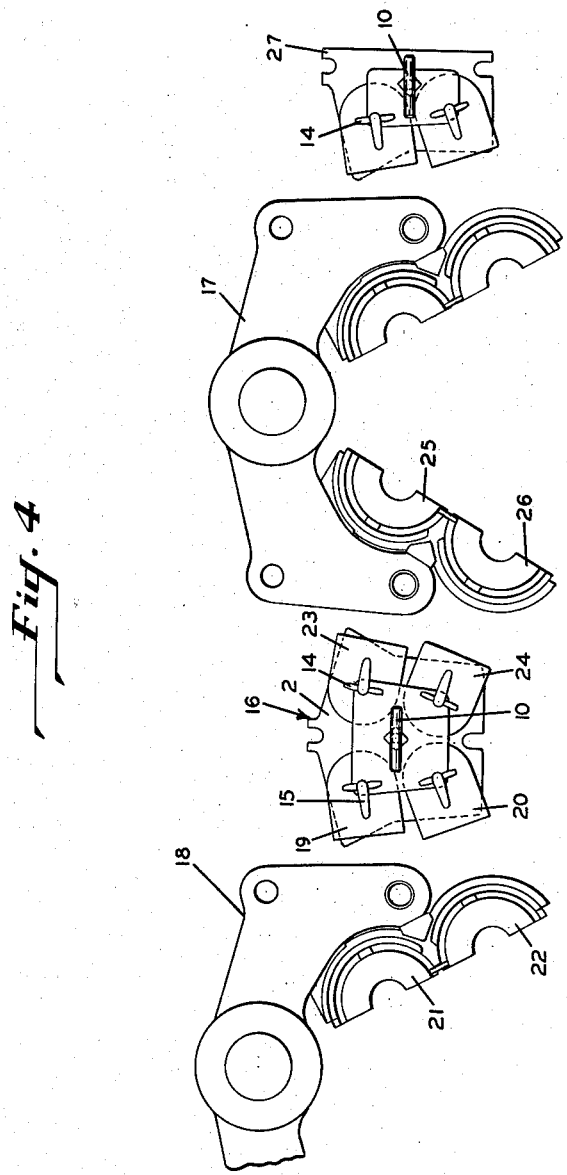

United States Patent Office 2,964,879
Patented Dec. 20, 1960

2,964,879

AIR COOLING SYSTEM

William R. Gibson, Millville, N.J., assignor to Armstrong Cork Company, Lancaster, Pa., a corporation of Pennsylvania Filed July 16, 1956, Ser. No. 598,011

2 Claims. (Cl. 49—40)

This invention relates to an air cooling system for the molds of glassware-making machines.

In making glassware such as bottles and the like, cooling air is directed onto the blank or parison molds and onto the final blow molds of the glassmaking machines to prevent sticking of the glass to the molds and to chill properly the glass for good article formation.

Air nozzles are provided on commercial glass bottle-making machines for directing cooling air onto the mold sections, but these are generally fixed, or adjustable only with considerable difficulty. Where multiple molds are used, two or more cavities being provided in a single mold section, it has been quite difficult to cool the multiple cavity molds properly to produce top quality articles from each mold cavity.

An object of the present invention is to provide a cooling system for glassmaking machines in which both the direction of the air and the volume of the air may be individually adjusted to obtain maximum cooling efficiency with single or multiple cavity molds.

Another object of the invention is to provide a cooling system by which individual half sections of a multiple cavity mold, such as a two-cavity bottle mold, may each be cooled with independently directed air streams of independently controlled volume.

A further object of the invention is to provide a cooling system for glassmaking machines wherein a single cooling unit may be positioned between adjacent pairs of mold sections to provide independently adjustable supplies of cooling air for each of the adjacent mold sections.

Other objects of the invention will be clear from consideration of the following description of an embodiment of the invention which is shown in the accompanying drawings, in which:

Figure 4 is a diagrammatic view showing cooling units of the invention positioned for cooling dual cavity final blow molds.

Figure 2:
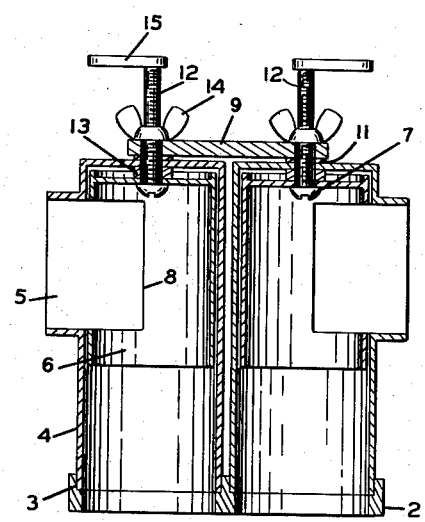
Figure 2 is a sectional view taken along the line II—II of Figure 1.
Figure 3:
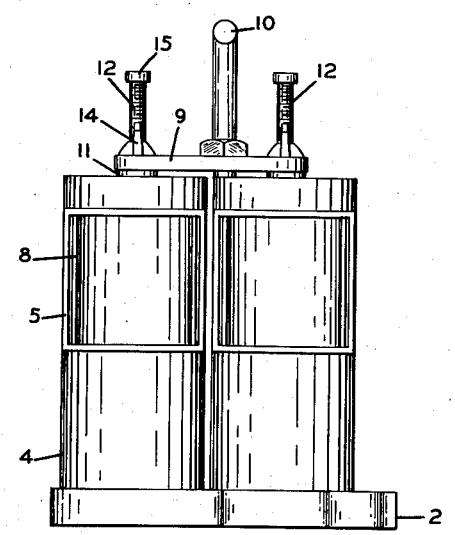
Figure 3 is a side elevational view of the unit shown in Figure 1.

The device comprises a base plate 2 which is mounted upon the machine above a source of cooling air. In the embodiment shown in Figures 1-3, the base plate 2 is provided with four counterbores 3 which receive individual air tubes 4 which are independently mounted for adjusting rotation therein. Each of these tubes is provided with an air-directing nozzle 5. As shown in Figure 3, this nozzle may have an opening which is essentially square in outline. The shape of the nozzle opening may be varied to suit the mold configuration.

Mounted within each of the air tubes 4 is a rotary valve 6 which controls the volume of air delivered through the tube 4. Each of the valves 6 is of hollow cylindrical configuration, and each is provided with a circular top or end plate 7, welded or otherwise secured to the valve body. An opening 8 is provided in the wall of the valve body; and when the valve is in fully opened position, the opening 8 will coincide in area with the area of the opening in nozzle 5.

The air tubes 4 are each independently adjustable, being rotatable in the counterbores 3, as mentioned above. A clamping plate 9 is provided through which passes a T-headed locking screw 10 which has its threaded end received within a threaded opening provided in the base plate 2. Washers 11 space the clamping plate 9 from the top walls of the air tubes 4. When the locking screw 10 is drawn down, the air tubes are fixed in position.

Figure 1:
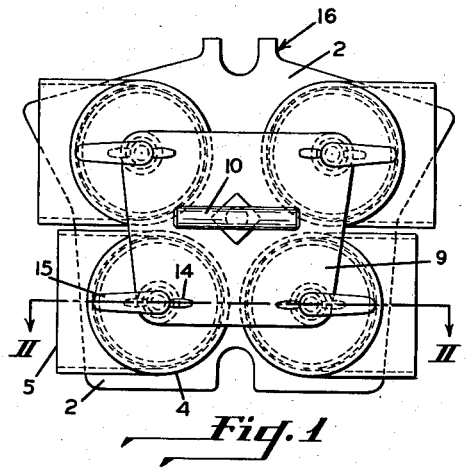
Figure 1 is a top plan view of an air cooling unit constructed in accordance with the invention.

The rotary valves 6 are also individually adjustable; and, by such adjustment, control of the volume of air delivered through each of the nozzles 5 is effected. This adjustment is obtained through threaded studs 12 which are welded or otherwise fastened to the heads 7 of the valves 6 and project upwardly through spacing washers 13 disposed between the heads 7 and the top wall of the air tubes 4, through the spacing washers 11 previously described, and through clamping plate 9. Winged nuts 14 are received on the studs 12 and serve to clamp the valves in adjusted position. Indicating handles 15 are secured to the studs 12, as shown in Figures 1-3.

Figure 4 diagrammatically shows the cooling unit 16 of the other views positioned between adjacent pairs of glass bottle molds 17 and 18 of a standard Emhart I.S. machine. The nozzles 19 and 20 direct air onto the mold half sections 21 and 22, and the nozzles 23 and 24 direct air onto the mold half sections 25 and 26. The line of direction of the cooling air and the volume of air directed on to each mold section are both of significant importance; and, with applicant's device, precise adjustment of the direction and amount of air for each mold half section may be effected.

Adjustment of the individual nozzles is obtained by loosening the locking screw 10 and the winged nut 14 for the individual unit to be adjusted. The air tube 4 may then be rotated in the counterbore 3 of the base plate 2 to bring the nozzle to the desired position. The air volume control may be adjusted at the same time, or it may be adjusted independently. Where a valve is to be adjusted without change of the position of the air tube, the appropriate winged nut 14 is loosened and the indicator handle 15 turned to bring the valve 6 to the desired adjusted position. When the desired adjustment of the valve has been made, the locking winged nut 14 may be retightened to hold the parts in adjusted position.

It will be clear from the right-hand portion of Figure 4 that the air supply unit may be divided so that the end molds on the machine may be supplied with air from a two-nozzle unit instead of the four-nozzle unit for the intermediate molds. A unit 27 will be provided for the right-hand half of the mold unit 17, as shown in Figure 4, and a similar unit, but of reverse hand, will be provided for the outermost half section on the opposite end of the machine.

Where the molds are of the single cavity type, instead of the multiple cavity type as shown in Figure 4, dual nozzles may not be required; and, in such event, the air supply unit may be constructed with a single air tube and nozzle and a single valve for each mold half section with which it is to operate. The air supply unit 16, for instance, would have two air tubes, one directed to the right and one directed to the left, as viewed in Figure 4. Dual unit nozzles may be used, however, with single cavity molds, for excellent air distribution on a single cavity mold may be attained by adjustment of the two nozzles.

It will be clear from the foregoing that the air distribution arrangement of the present invention may be applied to molds of various sizes and configuration. For instance, the units shown in Figure 4 may be used successfully on an Emhart I.S. machine producing small bottles in multiple cavity molds or larger bottles in single cavity molds. By appropriate adjustment of the air tube nozzles and the air volume control valves, precise direction of the air and the volume thereof may be controlled to obtain best results for each particular type, size, and shape of bottle being produced. The adjustment is simple and easy to make and, once made, the unit may be securely locked in adjusted position.

I claim:

1. In a glassware-making machine including a mold section to be cooled, a cooling unit comprising a fixed base plate having an air delivery opening therein for communication with a source of supply of cooling air, a plurality of independently and rotatably adjustable air tubes mounted on said base plate in communication with said source of supply of cooling air to said base plate, a nozzle projecting from a nozzle opening in each air tube for directing cooling air principally onto a selected portion of said mold section when said air tube is in its adjusted position, means for holding said air tubes in their respective adjusted positions, an independently and rotatably adjustable valve fitted within each air tube, each valve having a port therein which cooperates with said nozzle opening to control the volume of air delivered through said nozzle, and means for holding said valves in their respective adjusted positions.

2. In a glassware-making machine including spaced multiple cavity mold units to be cooled, a cooling unit disposed between adjacent mold units and comprising a fixed base plate having an air delivery opening therein for communication with a source of supply of cooling air, four independently and rotatably adjustable air tubes mounted on said base plate in communication with said source of supply of cooling air to said base plate, a nozzle projecting from a nozzle opening in each air tube for directing cooling air principally onto a selected portion of a mold unit when said air tube is in its adjusted position, two nozzles being directed to the right and two nozzles being directed to the left for the supply of cooling air to said spaced multiple cavity mold units, an independently and rotatably adjustable valve fitted within each air tube, each valve having a port therein which cooperates with said nozzle opening to control the volume of air delivered through said nozzle, and means for holding said air tubes and values in their respective adjusted positions.

References Cited in the file of this patent

UNITED STATES PATENTS

| | | |
|---|---|---|
| 443,403 | Neville | Dec. 23, 1890 |
| 640,547 | Duffie | Jan. 2, 1900 |
| 835,928 | Allen | Nov. 12, 1906 |
| 919,737 | Loomis et al. | Apr. 27, 1909 |
| 994,806 | Wanko | June 13, 1911 |
| 1,120,760 | Tatum | Dec. 15, 1914 |
| 1,174,897 | Preston | Mar. 7, 1916 |
| 1,333,460 | Babson | Mar. 9, 1920 |
| 1,554,521 | Reece | Sept. 22, 1925 |
| 1,632,962 | Hanford | June 21, 1927 |
| 1,632,992 | Bragg | June 21, 1927 |
| 1,633,028 | La France | June 21, 1927 |
| 1,685,275 | Dodge | Sept. 25, 1928 |
| 1,685,546 | Lee | Sept. 25, 1928 |
| 2,078,048 | Baldwin | Apr. 20, 1937 |
| 2,167,919 | Wadsworth | Aug. 1, 1939 |
| 2,485,836 | MacConnell | Oct. 25, 1949 |
| 2,751,119 | Manning | June 19, 1956 |

FOREIGN PATENTS

| | | |
|---|---|---|
| 398,031 | France | Mar. 13, 1909 |